United States Patent
Kane et al.

[19]

[11] Patent Number: 6,078,850

[45] Date of Patent: Jun. 20, 2000

[54] METHOD AND APPARATUS FOR FUEL MANAGEMENT AND FOR PREVENTING FUEL SPILLAGE

[75] Inventors: William Francis Kane, Florida; Robert Jacob Von Gutfeld, New York, both of N.Y.

[73] Assignee: International Business Machines Corporation, Armonk, N.Y.

[21] Appl. No.: 09/033,734

[22] Filed: Mar. 3, 1998

[51] Int. Cl.[7] ........................................... G06F 17/00
[52] U.S. Cl. .............................. 701/29; 73/1.83; 340/439; 340/450.2; 700/282; 701/123; 701/213; 705/28; 705/400; 705/413
[58] Field of Search .................................. 701/1, 19, 29, 701/30, 33, 35, 36, 123, 207, 213; 340/988, 989, 993, 425.5, 438, 439, 450, 450.2, 825.34; 702/55; 73/1.73, 1.83, 290 R, 291, 290 B; 307/9.1, 118; 705/1, 28, 400, 413; 700/282

[56] References Cited

U.S. PATENT DOCUMENTS

| | | | |
|---|---|---|---|
| 5,359,522 | 10/1994 | Ryan | 705/413 |
| 5,450,321 | 9/1995 | Crane | 701/35 |
| 5,793,705 | 8/1998 | Gazis et al. | 367/98 |
| 5,923,572 | 7/1999 | Pollock | 700/282 |
| 5,928,291 | 7/1999 | Jenkins et al. | 701/1 |

*Primary Examiner*—William A. Cuchlinski, Jr.
*Assistant Examiner*—Edward Pipala
*Attorney, Agent, or Firm*—McGinn & Gibb, P.C.

[57] ABSTRACT

A management system for a vehicle having a commodity storage region and traveling along a path having a plurality of geographically-distributed commodity replenishing stations, includes a sensor for measuring a level of the commodity in the storage region and providing commodity level data. A global positioning system (GPS) determines a location of the vehicle along the path. A controller stores a record of current geographical locations of the commodity replenishing stations and current commodity prices thereat, and calculates commodity replenishing schedules of the vehicle at the replenishing stations based on an output from each of the GPS and the sensor, and a commodity price at at least some of the replenishing stations.

32 Claims, 2 Drawing Sheets

6,078,850

METHOD AND APPARATUS FOR FUEL MANAGEMENT AND FOR PREVENTING FUEL SPILLAGE

BACKGROUND OF THE INVENTION

The present invention generally relates to a fluid (e.g., fuel) management method, and more particularly to a fluid management method for monitoring and tracking the amount of fuel (or other fluid) that is delivered to engines (e.g., diesel locomotive or vessel engines, etc.) either at mobile or fixed wayside fueling stops or at the fueling racks at railroad fueling terminals.

Further, the invention relates to a method of avoiding fuel spills utilizing the fuel management methods. Additionally, the information regarding the fuel status, time, and vehicle position can be communicated to central and distributed fuel management environments.

Description of the Related Art

Conventional methods and systems for tracking fuel delivered to wayside (e.g., en route) vehicles and the like, generally include a metering device and an inventory logging system including the vehicle type/nomenclature and number, as well as the fuel quantity, type, and date/time of refueling.

However, better records of the fuel delivered to vehicles (e.g., diesel locomotives) are needed to minimize the possibility of fraud or cheating by wayside delivery vehicles and the like.

Further, obtaining the best fuel price is important. To obtain the best price requires knowledge of the local fuel price with respect to the nearest fueling location where the price may be cheaper. Thus, the minimum amount of fuel can be purchased at the higher price.

Another problem of the conventional systems and methods is that there has been no effective way to prevent fuel spills from occurring at local fuel stops due to hose rupture resulting from failure to disconnect the hose prior to train movement, or the like. For example, the ripping or shearing of the fuel hose often occurs due to train movement while fuel delivery is occurring.

Indeed, fuel spills are a major problem for railroads. According to data from the American Association of Railroads, 10,000,000 gallons of fuel are spilled each year (e.g., some due to train derailments but many due to hose rupture and the like) at a cost of over $100,000,000 in cleanup costs. Obviously, this is a major problem of wasting and squandering precious natural resources, as well as an environmental hazard.

Oftentimes, it is not possible under the present systems to identify the party responsible for the fuel spill, and hence the cleanup cost cannot be properly apportioned to the negligent party. If no party can be identified as being responsible for the fuel spill, cleanup cost is automatically incurred by the railroad. Thus, it becomes additionally important to avoid spills during fueling or to assign specific responsibility.

SUMMARY OF THE INVENTION

In view of the foregoing and other problems of the conventional systems and methods, it is an object of the present invention to provide an interactive approach to fuel management and better record-keeping of sensitive materials (e.g., fuel) delivered to vehicles (e.g., diesel locomotives in a preferred embodiment but obviously any movable vessel or vehicle or stationary liquid receptacles would find benefit in the present invention) in order to avoid the possibility of cheating by wayside delivery vehicles.

Another object is to provide a system and method in which the best price for a commodity (e.g., fuel) can be obtained by utilizing knowledge of the local fuel price with respect to the nearest fueling location where the price may be cheaper, so as to minimize the amount of fuel at a higher price. Careful use of inventory methods will enable large fuel savings and prevent cheating and fraud by delivery people, while also allowing the calculation of how much fuel is need in order to obtain the cheapest fuel possible en route to the vehicle's destination.

Yet another object is to provide a system and method for effectively preventing fuel spills from occurring at local fuel stops due to, for example, hose rupture resulting from failure to disconnect the hose prior to train movement.

In a first aspect of the present invention, a system for achieving the above objects is provided, utilizing a liquid or fuel sensor that continuously monitors the fuel as it is being used. Simultaneously, this fuel level information is inputted to a computer for calculating how many miles the specific vehicle (e.g., train) can travel based on fuel consumption per mile. Such a calculation is an ongoing (e.g., continuous) calculation as the train proceeds from its last fueling stop.

In the first aspect of the invention, the fuel management system for a vehicle having a fuel tank and traveling along a path having a plurality of geographically distributed fuel stations, includes a fuel sensor for measuring a level of fuel at any time in the vehicle's (e.g., train's) fuel tank and providing fuel level data, a global positioning system (GPS) for determining a location of the vehicle along the path, a controller on board the vehicle for storing a record of the current geographic locations of the fuel stations and the current fuel prices thereat, and for calculating refueling schedules of the vehicle at the fueling stations based on an output from each of the GPS data and the fuel sensor, and a fuel price at at least some of the refueling stations.

In a second aspect of the present invention, a fuel management system having an integrated fuel control, includes a central station having a controller system for optimizing refueling schedules, based on fuel consumption rates, distances, fuel levels, and fuel prices, and at least one vehicle moving along branches of a transportation network, each of the at least one vehicle including:

a fuel tank; a fuel sensor for measuring a level of fuel in the fuel tank and providing fuel level data; a global positioning system (GPS) for determining a location of the vehicle along the path; a transmitter for transmitting fuel level and GPS data to the central station; and a plurality of fuel stations distributed along the path.

In a third aspect of the invention, a management system for a vehicle having a commodity storage region and traveling along a path having a plurality of geographically-distributed commodity replenishing stations, includes a sensor for measuring a level of the commodity in the storage region and providing commodity level data; a global positioning system (GPS) for determining a location of the vehicle along the path; and a controller for storing a record of current geographical locations of the commodity replenishing stations and current commodity prices thereat, and for calculating commodity replenishing schedules of the vehicle at the replenishing stations based on an output from each of the GPS and the sensor, and a commodity price at at least some of the replenishing stations.

Additionally, the replenishing station preferably includes a device/mechanism for providing its level data and a gauge for measuring the quantity delivered to the vehicle.

In a fourth aspect of the invention, a stationary storage unit for use with a central station, includes a housing for storing a commodity; a commodity sensor mounted on the housing for sensing a commodity amount within the housing; a global positioning system (GPS) for determining a location of the housing; and a transmitter, mounted on the housing, for transmitting a commodity amount data and GPS data to the central station.

With the unique and unobvious aspects and features of the present invention, extremely accurate records are maintained on fuel delivery, allowing vehicles to be refueled in a cost-optimum manner.

The present invention allows for efficiently tracking how much fuel is onboard a train while it is in motion (e.g., impossible with conventional fuel sensors), thereby providing the ability to calculate how much further it can travel with the remaining onboard fuel.

Further, a record of fuel consumption in real-time is maintained, and the position and consumption can be communicated to an onboard computer, as well as to a central fuel management center.

Additionally, with the present invention, the best price for fuel may be obtained based on the train's route. Additionally, vendors and the fuel delivery thereby can be accurately tracked.

Further, spillage resulting from overfilling or train motion before fuel hose disconnect, can be reliably avoided by the present invention. Moreover, fuel vendors may be tracked in case of accidental spillage at the place of fueling, and thus responsibility for any negligence can be firmly fixed with the perpetrator, thereby leading to more care being taken by vendors and less spillage.

For example, the difference between the fuel intake as measured by the on-board fuel sensor and the amount allegedly delivered by the vendor could easily correlate with a fuel spill. The time, date, and location would be recorded so that the locomotive and vendor would be identified for potential responsibility and liability.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
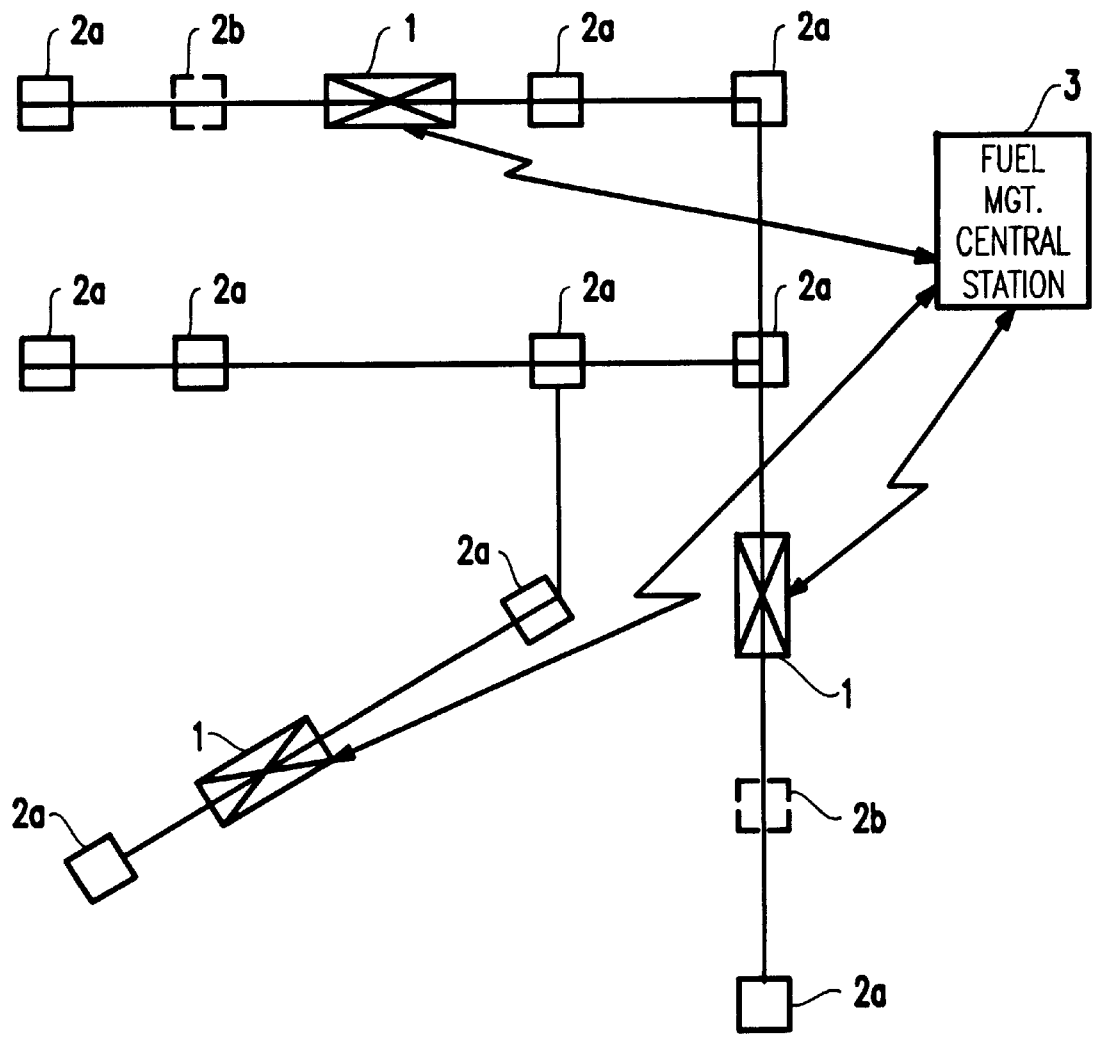
FIG. 1 illustrates schematically an environment and configuration of a fuel management apparatus and system according to the present invention.
Figure 2:
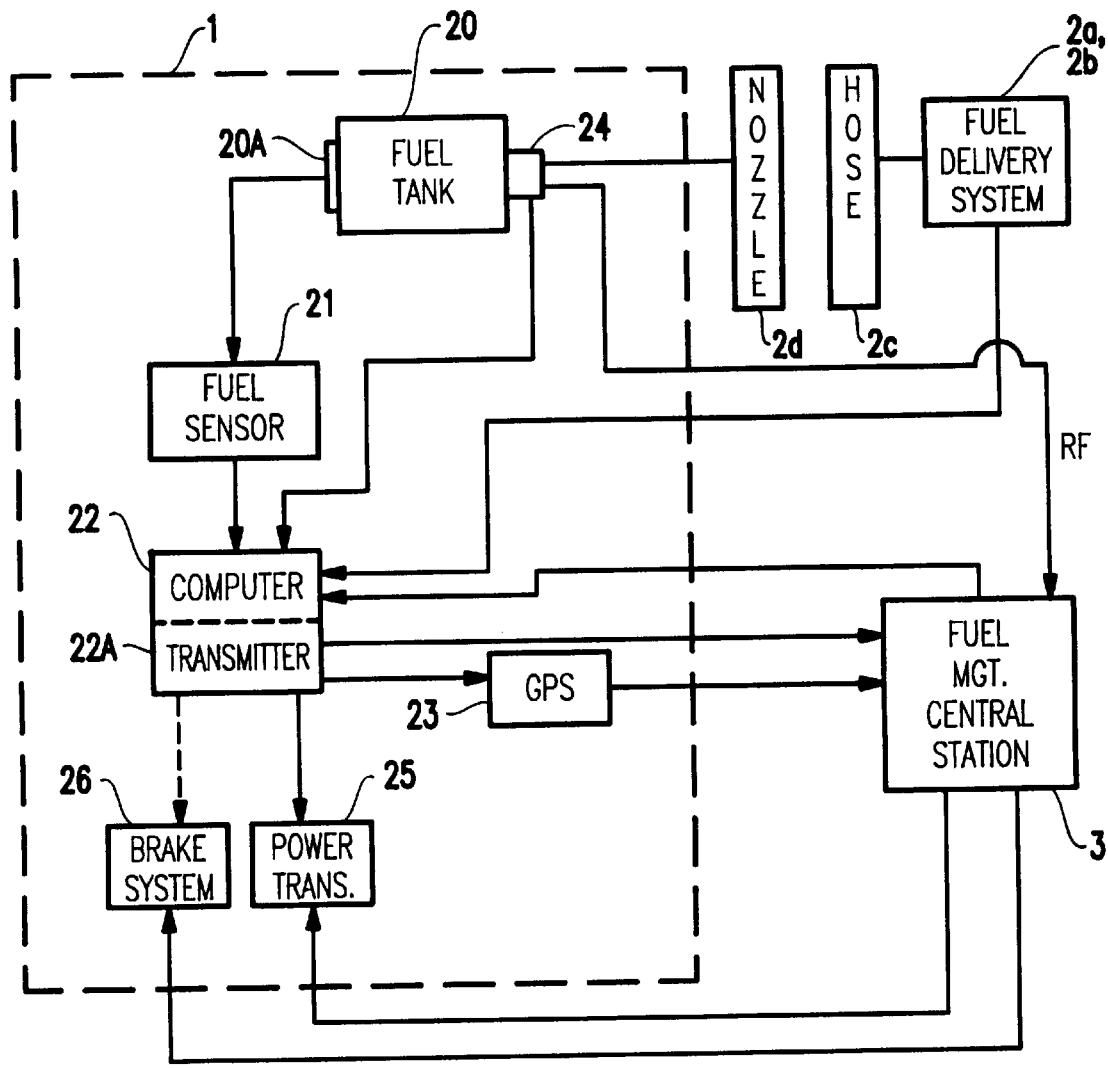
FIG. 2 illustrates schematically the fuel management system according to the present invention including a vehicle 1 (e.g., a locomotive) for interacting with a fuel management central station 3 or a distributed system and a fueling station.

Referring now to the drawings, and more particularly to FIGS. 1–2, there is shown a preferred embodiment of the present invention.

Turning first to FIG. 1, there is shown a vehicle (e.g., in an exemplary implementation a train such as a diesel locomotive) which travels along a predetermined path (e.g., railroad tracks) along which there are a plurality of delivery systems such as fixed stations 2a for dispensing a needed commodity (e.g., in the exemplary implementation, fuel, but of course other sensitive liquids or commodities could be employed as would be known by one of ordinary skill in the art within the purview of the present specification) and mobile fueling stations 2b.

Mobile fueling stations 2b are provided to deliver fuel to the train 1 at intervals requested by the locomotive engineer or other personnel and other than those found at the fixed fueling stations 2a. The mobile fueling stations may be trucks, rail or tanker vehicles operable along the path (tracks), or the like.

Each of the fuel delivery systems 2a, 2b includes a hose 2c coupled to the fuel source of the delivery systems and a nozzle 2d coupled to an end of the hose 2c for delivery of fuel to the train 1.

A fuel management/central station 3 is provided for receiving inputs from the trains 1 along the path(s), and for transmitting outputs thereto, thereby monitoring and communicating with the trains 1.

Preferably, the fuel management/central station 3 includes a central computer/processor including a radio frequency (RF) receiver and transmitter, a read-only memory (ROM) for storing programs for operating the system and control thereof, a random access memory (RAM) for storing information relating to fuel pricing at all fueling stations in the network, position information, quantity dispensed, distance to next fuel stations, and the like.

By monitoring and communicating with the vehicles 1, as well as by being provided with information in realtime or otherwise from each of the individual fixed refueling stations 2a and mobile stations 2b, the fuel management/central station 3 communicates with the trains 1 to provide, for example, the lowest price of fuel for trains traveling long routes and requiring refueling en route.

For example, the central station 3 may be updated with the latest price information on a daily basis or even more often depending upon the pricing algorithm. Thus, the preferred updating interval can be freely set by the designer according to the designer/operator's constraints and requirements.

Further, instead of passively waiting to be updated with the latest pricing information, the central station 3 may actively solicit the latest pricing information by sending a polling signal at a predetermined interval (e.g., once per hour, once per day, etc.) or at the request of vehicle personnel and receive back the pricing information etc. from the fixed fueling stations and mobile stations via radio frequency. Thus, the central station may receive pricing information by RF polling or, for smaller vendors, by telephone.

The central station 3 calculates in advance (e.g., while the vehicle is moving toward its destination) and in realtime how much fuel is needed by each vehicle at each of a plurality of fixed fueling stops along the path/route in the network. The central station 3 calculates the amount of fuel needed with the fuel price, stored in the RAM memory of the central station 3, to take advantage of a potential lower price at the next available fueling stop.

With such calculation by the central station 3, since almost 4 billion gallons of diesel fuel are consumed per year by the nation's railroads, a few cents per gallon price differential would constitute a significant potential cost-saving.

Referring now to FIG. 2, a schematic block diagram of a vehicle 1 (e.g., in the exemplary embodiment, a diesel locomotive) is shown.

Each locomotive 1 includes a fuel tank 20 for receiving fuel from the fixed refueling stations 2a or from the mobile refueling stations 2b, via a nozzle (not shown) or the like.

Each vehicle 1 further includes a unique fuel sensor (gauge) 21. Such a sensor is important, since simultaneously with the above-mentioned calculation by the central station 3, it must be ensured that the quantity of fuel being charged to an account (e.g., the railroad) is indeed the quantity delivered. Thus, in the present invention, the locomotive (or other vehicle receiving the fuel) includes an independent means for measuring the fuel quantity being delivered and accounted for by the delivery person.

Such a mechanism for measuring fuel quantity is provided by a unique fuel sensor/gauge 21. Such a sensor may include a fuel sensor invented by the present inventors and a third party, and disclosed in U.S. Pat. No. 5,793,703.

The fuel sensor 21 continuously monitors the fuel as it is being used. Simultaneously, this fuel level information is inputted to a computer (described in further detail below) for calculating how many miles the vehicle (e.g,. train) can travel based on fuel consumption per mile. Such a calculation is an ongoing (e.g., continuous) calculation as the train 1 proceeds from its last fueling stop.

Thus, the sensor 21 accurately measures the quantity of fuel in the tank and tracks the differential in fuel that results from refueling.

Preferably, the above-mentioned sensor is used, since this sensor—accurately provides fuel readings that can be obtained continuously (while stationary or moving) from inside the locomotive cab under the adverse conditions of heat, vibration and sediment build-up.

The sensor 21 utilizes acoustic echoes and uses an algorithm that accounts for a non-steady surface of the liquid due to turbulence and vibration inherent with a moving train. The sensor preferably 21 is mounted externally to the fuel tank 20 so that it is not damaged by the hot fuel or the accumulation of sediment, typically present in a locomotive fuel tank.

Additionally, an ultrasonic plate formed 20A, for example, as an annular ring, is used for preventing the accumulation of debris in the region of the fuel sensor. At least one sensor 21 is provided with the invention. Of course, a plurality of sensors 21 may be mounted to assure accuracy and to account for, for example, when the train is negotiating a grade, thereby making the liquid level non-uniform (e.g., tilted). With proper separation of, for example, two sensors 21, this difference between the two liquid levels can be accurately accounted for by the computer.

Thus, the fuel sensor 21 accurately measures the fuel in the tank 20, and tracks the differential in fuel that results from refueling. Other onboard sensors can also be used for this purpose. Hence, sensor 21 provides an accurate reading of the quantity of fuel in the fuel tank 20 and provides an accurate reading of the differential between the fuel delivered (e.g., "pumped") and the fuel actually received into the tank 20 of the locomotive of interest.

The locomotive 1 further includes an onboard computer 22 including a radio transmission device/system (transmitter) 22A. The transmitter 22A is for transmitting the sensor data to the delivery vehicle (e.g., fixed or mobile fuel tanker) 2a, 2b, for terminating the fuel delivery by activating a cut-off switch in either the delivery system 2a, 2b, or on the nozzle 2d of the delivery hose 2c.

Further, the transmitter 22A transmits, via mobile communication, a record of location, fuel vendor, delivery time and date, and the amount of fuel delivered, to the railroad's central communication office (e.g., fuel management/central station 3) for record-keeping. The total price also is included.

Further, the controller monitors changes in fuel consumption to determine a time of engine maintenance. If, for example, there is a gradual or precipitous increase in fuel consumption for a given load, the engine probably requires a maintenance check and the vehicle engineer may be alerted accordingly.

Thus, the computer used in the present invention preferably includes a mechanism for performing radio transmission of the sensor data for cutting-off the fuel delivery by activating an electronically-operated cutoff switch in the delivery vehicle or system, or on the nozzle 2d of the fuel hose 2c.

For example, the signal is generated from the local transmitter activated by the information from the fuel sensor and the computer which indicates either that the tank is full or how much fuel is desired by presetting the desired level at this particular fueling station. Such a setting is particularly useful in the event that cheaper fuel exists at some relatively nearby location.

Additionally, the locomotive includes a commercially available Global Positioning System (GPS) 23 may be employed to pinpoint the exact location where fuel delivery occurred.

Specifically, the global positioning system (GPS) is used in conjunction with stored data to locate fueling stations either from a lookup table (LUT) from the on-board computer or by communicating with the fuel management center.

Thus, if there is a fuel spill, the deliverer can be held accountable for any cleanup costs and/or any federal Environmental Protection Agency (EPA) and other state/nationality fines. Thus, responsibility for the fuel spillage is fixed.

Further, the deliverer will be discouraged from charging such fuel spillage to the railroad, and the railroad will pay for only the actual fuel delivered to the respective vehicle.

The GPS system also can be used to order fuel at locations previously unscheduled due to unforeseen needs, by communicating the position of a train (vehicle) to a fuel purveyor with wayside delivery capability based on the information in the computer lookup table.

As described above, the onboard fuel 21 sensor activates a cutoff mechanism, thereby avoiding fuel spills from overflow, which is a typical problem encountered.

Another source of fuel spill is the ripping or shearing of the fuel hose caused by accidental train movement while fuel delivery is still in progress. That is, the fuel hose of the mobile refueling station or of the fixed refueling station is delivering fuel while the train begins moving to its next destination. Typically, such problems are avoided by manual signals or communication between fuel delivery personnel and the train's engineer, which is a very "low tech" approach to avoiding such a problem and the major cause of fuel spillage.

Thus, to avoid the problem of fuel spillage due to shearing of the hose and the like, an apparatus 24 (e.g., a hose insertion sensor) is provided for transmitting an electronic signal to a central controller (e.g., either an onboard computer 22 or to the central station 3) upon insertion of the fueling hose and nozzle into the fuel tank 20.

Thus, such transmission is performed either directly or by radio transmission to a central controller, either on-board (e.g., on-board computer 22) or off-board at a central management site (fuel management central station 3), which affirmatively and purposely prevents the train from moving under its own power until the hose is disconnected.

Specifically, the controller upon receiving a signal from the sensor 24 issues a cut-off signal to the power train/ transmission 25 of the train. Such a disconnect may be embodied for example, to open a switch, thereby disconnecting the transmission. Operationally, this is very similar to a well-known "Chapman"™ lock used to prevent theft of automobiles.

Alternatively (or additionally for even greater security), the controller may issue a signal to the train braking system 26 upon receipt of the hose insertion signal from the sensor 24, thereby braking the train until the sensor 24 either issues a signal representing that the hose is not inserted any longer into the fuel tank or in another embodiment in the absence of the hose insertion signal (assuming that the hose insertion signal is continuously transmitted during insertion into the fuel tank).

As yet another alternative, the sensor 24 may directly brake the train by issuing to the train braking system 26 a signal representing that the hose is not inserted any longer into the fuel tank 20 or in another embodiment in the absence of the hose insertion signal (assuming that the hose insertion signal is continuously transmitted during insertion into the fuel tank 20).

For locomotives that are not coupled to their freight cars, a different system may be employed since these locomotives are often moved by switch engines in the yard.

Specifically, during fueling, preferably a mechanical interlock is activated that locks the coupler (e.g., a "knuckle") making it impossible for the switch engine to connect to the locomotive. Thus, so long as the hose is connected, the locomotive is unable to move or be moved. Specifically, by also activating the braking system 26 when the hose is inserted at this time, the locomotive cannot roll even if "bumped" by the switch engine. While such a problem is not foreseen, additionally activating the braking system 26 as described above, ensures that the locomotive cannot move during refueling and thereby ensuring that there will be no hose rupture or nozzle slipping if the brake was not activated at the start of fueling.

Alternatively, if the switch engine is already connected to the diesel locomotive undergoing fueling, the transmission of the switcher is disconnected in a manner just described for the locomotive making it impossible for the switch engine to move the locomotive undergoing fueling.

The above-mentioned structure of the system and structure of the locomotive is believed to be easily implemented using existing mobile technology in addition to the onboard fuel sensor described above. Other fuel sensors also could be used.

Additionally, nozzles already having shut-off valves which can be modified to accommodate the GPS 23 described above also may be employed.

Exemplary Operation of the Preferred Embodiment

A freight train is moving from the West Coast towards its destination (e.g., Chicago).

A fuel sensor 21 as disclosed in U.S. patent application Ser. No. 08/710,454, as mentioned above, is provided on board and includes an ultrasonic plate 20A and ultrasonic sensor. With the fuel sensor 21, the fuel level is constantly monitored, or intermittently monitored at periodically chosen intervals, as desired by the system designer/operator.

While not in a monitoring state, the ultrasonic plate of the fuel sensor 21 is active thereby keeping debris away from the ultrasonic sensor. Both plate 20A and sensor 21 preferably are mounted on the bottom of the tank's outer surface.

During monitoring, the annular low frequency ultrasonic cleaning plate 20A is controlled to be inoperative for maximum accuracy of the gauge. Monitoring is conveniently set to occur at predetermined intervals (e.g., intervals of five minutes for a 10-second monitoring period) for the purpose of tracking fuel levels as a quasi-continuous function of time.

Preferably, a plurality (e.g., at least two) of identical sensors 21 are mounted at predetermined locations within the tank 20 (e.g., near each end of the tank in the case of using two gauges), and are used to obtain a superior average of the level. This feature is especially beneficial when the train is on a steep grade. The levels are recorded by the onboard computer 22.

For example, as the train approaches Omaha, Nebr., it becomes clear that more fuel will be needed to complete the scheduled trip based on the fuel consumption per/mile, computed from the fuel sensor at known mileage (time) intervals and the position given by GPS.

The GPS system 23 notifies the engineer as to his location and this position is communicated to the fuel management center, as is the fuel level at that position (e.g., determined from the fuel sensor 21). The center's computer has a data base of all names and locations of possible fueling stations and wayside suppliers along the train's route and transmits back an instruction which is displayed either visually or audibly provided to the engineer.

For example, the following instruction may be provided to the engineer:

"Based on your present fuel consumption, remaining fuel and present position (determined by GPS) stop 100 miles east of Omaha and take on 1000 gallons of fuel at 80 cents/gallon from Jason's fuel supply, a wayside truck supplier which will meet you at mile marker 102. Based on your fuel consumption per mile, and this location, 1000 gallons of fuel will enable your train to travel 150 miles further east without any trouble at which point you will reach one of our own fueling stations. Fill up at that location at a price of 65 cents/gallon, i.e. 5000 gallons. With this amount of fuel you will have more than enough fuel to reach Chicago."

At each of the two fueling stops, the fuel is monitored by the on board fuel sensor 21 to verify true delivery quantities which are recorded on the onboard computer 22. These data in turn are telecommunicated (e.g., via radio, satellite uplink or the like with transmitter 22A) to the central fuel management center 3 for record-keeping and liability should there be a fuel spill.

Thus, the fuel management center 3 and the onboard computer 22 have a record of when, where, how much fuel and from whom the fuel was supplied.

The fueling cycle includes the following sequence.

Specifically, as soon as the nozzle is inserted into the locomotive 1 and sensed by a sensor 21 at the nozzle insertion point of the fuel tank 20, an electronic signal is sent via the computer (either onboard computer 22 or central station 3) and received by the fueling truck or fueling rack, to open the nozzle followed by a short time delay (1–5 seconds) to start the fuel pump.

The onboard computer 22 (or central controller 3), via the fuel sensor 21, determines when to end the fueling cycle by outputting a second electronic signal that shuts off the pump and the fuel nozzle. This monitoring by the onboard computer (or controller 3) will prevent overfilling and fuel blow off from the engine as well as spillage from the fuel nozzle. The tank will never be over-filled since a signal is outputted to turn off the pump, even when not manually selected, when the tank 20 is full.

At the start of fueling, an additional electronic signal is preferably sent from the locomotive's computer once the train is fully stopped to disconnect the locomotive transmission from the locomotive drive wheels, so that the train cannot move until the nozzle is removed from the engine, thereby reducing fuel spillage.

To utilize this feature, a second signal is preferably outputted from the fuel truck or fuel rack to the on-board controller 22 to re-engage the transmission.

This disconnect signal can only be sent from the locomotive and only when the train is fully stopped, thereby averting any unauthorized transmission disconnects from the locomotive or unauthorized (e.g., devious) sources outside of the locomotive.

The unique and unobvious method and structure of the present invention allow for efficiently tracking how much fuel is onboard a train while it is in motion (e.g., impossible with existing fuel gauges), thereby providing the ability to calculate how much further it can travel with the remaining onboard fuel.

Further, a record of fuel consumption in real time is maintained, and the position and consumption can be communicated to an onboard computer, as well as to a central fuel management center.

Additionally, with the present invention, the best price for fuel may be obtained based on the train's route. Specifically, across the country the price variation may be as much as 15 cents/gallon. The invention allows knowledge of the fuel prices in real time at any location while the train is either in motion or stationary. Additionally, vendors and the fuel delivery thereby can be accurately tracked.

Further, spillage resulting from overfilling or train motion before fuel hose disconnection, can be reliably avoided by the present invention. Moreover, fuel vendors may be tracked in case of accidental spillage at the place of fueling, and thus responsibility for any negligence can be firmly fixed with the perpetrator, thereby leading to more care being taken by vendors and less spillage.

It is noted that the structure of the present invention is easily retrofitted onto existing fuel tanks and fueling systems. For example, structures of the present invention can readily be retrofitted onto existing locomotive engines.

While the invention has been described in terms of a single preferred embodiment, those skilled in the art will recognize that the invention can be practiced with modification within the spirit and scope of the appended claims.

For example, while generally, the present invention provides efficient liquid (e.g., fuel or other sensitive liquid) management which for exemplary purposes in the present application is applied to railroads (e.g., diesel locomotives), the present invention can be easily applied to other fuels, sensitive materials and commodities (e.g., gasoline, kerosene, JP4 aircraft fuel, etc.) as well as other vessels (sea, land and/or air) for being powered by the fuel, as would be known by one of ordinary skill in the art within the purview of the present application.

Moreover, as more cars obtain GPS capability, the invention would be equally beneficial to private automobiles.

Additionally, the concepts described above of the present invention could be extended easily to home and industry delivery of various commodities and liquids.

Further, the invention can be used on railroad tank cars or stationary storage tanks to record and transmit liquid levels to management centers. The liquid sensor also can be used to record possible leakage from moving vehicles or stations tanks to enable notification to management centers for alerting authorities for appropriate action and/or maintenance crews for performing any required maintenance.

Having thus described our invention, what we claim as new and desire to secure by Letters Patent is as follows:

1. A fuel management system for a vehicle having a fuel tank and traveling along a path having a plurality of geographically-distributed fueling stations, said system comprising:

a fuel sensor for continuously measuring a level of fuel in said fuel tank and providing fuel level data;

a global positioning system (GPS) for determining a location of said vehicle along said path; and a controller for storing a record of current geographical locations of said fueling stations and current fuel prices thereat, and for calculating refueling schedules of said vehicle at said fueling stations based on an output from each of said GPS and said fuel sensor, and a fuel price at at least some of said fueling stations, wherein said controller obtains data for the lowest price fuel available based on the tank level being measured continuously by said fuel sensor, and wherein said controller controls fueling of said fuel tank such that refueling of said fuel tank is performed only partially at a lowest price fueling station that the vehicle can reach.

2. A fuel management system according to claim 1, wherein said controller is provided onboard said vehicle.

3. A fuel management system according to claim 1, wherein said controller comprises a central fuel management station provided off-board said vehicle.

4. A fuel management system according to claim 1, wherein said controller mutually controls fueling and restarting of said vehicle to prevent spillage of said fuel.

5. A fuel management system according to claim 1, wherein said record comprises information regarding fuel spillage.

6. A fuel management system according to claim 1, wherein said controller monitors changes in fuel consumption by said vehicle to determine a time of engine maintenance.

7. A fuel management system according to claim 1, wherein said fuel sensor includes a transmitter for communicating a fuel level measurement in said tank to said controller.

8. A fuel management system according to claim 1, wherein said fuel sensor includes an ultrasonic plate for preventing contaminants from accumulating in a region required for performing a fuel level measurement.

9. A fuel management system according to claim 1, further comprising a second fuel sensor mounted on said fuel tank, said fuel sensor and said second fuel sensor for taking first and second readings of said fuel level, respectively, such that an average of said first and second readings is provided.

10. A fuel management system according to claim 1, further comprising a communication link, coupled to said controller, for relaying measurement information provided by said fuel sensor.

11. A fuel management system according to claim 1, wherein said controller comprises an on-board processor, said system further comprising:

a communication link, provided between said fuel sensor and a fueling station, for indicating fuel shutoff of said fueling station.

12. A fuel management system according to claim 1, wherein said GPS correlates fuel measurement with geographic position.

13. The system according to claim 1, wherein said fuel tank is refueled at a current fueling station only to a level which enables said vehicle to travel to a next fueling station and without completely filling said fuel tank, said next fueling station having a fuel price lower than that of said current fueling station.

14. A fuel management system having an integrated fuel control, comprising:

at least one vehicle moving along a path and including a fuel tank;

a plurality of fuel stations distributed along said path;

a central station having a controller system for optimizing refueling schedules, based on fuel consumption rates, distances, fuel amounts in said fuel tank, and fuel prices, each said at least one vehicle including:

a fuel sensor for continuously measuring a level of fuel in said fuel tank and providing fuel level data;

a global positioning system (GPS) for determining a location of said vehicle along said path;

a controller on board said at least one vehicle for storing a record of current geographical locations of fuel stations and current fuel prices thereat, and for calculating refueling schedules of said at least one vehicle at said fuel stations based on an output from each of said GPS and said fuel sensor, and a fuel price at at least some of said fueling stations; and a transmitter for transmitting fuel level and GPS data to said central station, wherein said controller obtains data for the lowest price fuel available based on the tank level being measured continuously by said fuel sensor, and wherein said controller controls fueling of said fuel tank such that refueling of said fuel tank is performed only partially at a lowest price fuel station that the vehicle can reach.

15. A fuel management system according to claim 14, wherein said controller system mutually controls fueling and restarting of said at least one vehicle to prevent spillage.

16. A fuel management system according to claim 14, wherein said record comprises information regarding fuel spillage.

17. A fuel management system according to claim 14, wherein said controller system monitors changes in fuel consumption of said at least one vehicle to determine a time of engine maintenance.

18. A fuel management system according to claim 14, wherein said fuel sensor includes a communicator for communicating a fuel level measurement in said tank to said controller system.

19. A fuel management system according to claim 14, wherein said fuel sensor includes a device for preventing contaminants from accumulating in a region required for performing a fuel level measurement.

20. A fuel management system according to claim 14, further comprising:

a second fuel sensor mounted on said fuel tank, said fuel sensor and said second fuel sensor for taking first and second readings of said fuel level, respectively, such that an average of said first and second readings is provided.

21. A fuel management system according to claim 14, further comprising a communication link, coupled to said controller system, for relaying measurement information provided by said fuel sensor.

22. A fuel management system according to claim 14, wherein said GPS correlates the fuel measurement with geographic position.

23. A fuel management system according to claim 14, wherein said central station comprises a processor, said system further comprising:

a communication link provided between said controller system and said central station, for communicating data therebetween.

24. A fuel management system according to claim 14, wherein said fuel sensor comprises a cleaning device for cleaning at least one region of said fuel tank, said cleaning device comprising at least one ultrasonic plate operating in a kHz range, said fuel sensor comprising an ultrasonic fuel level sensor, said plate being attached adjacent said ultrasonic fuel level sensor.

25. A fuel management system according to claim 14, further comprising an ultrasonic plate having a shape of an annulus, wherein said fuel sensor is mounted within an open region of said annulus.

26. A fuel management system according to claim 25, wherein said fuel sensor comprises an ultrasonic high frequency transducer for transmitting and receiving ultrasonic echoes.

27. The system according to claim 14, wherein said fuel tank is refueled at a current fuel station only to a level which enables said vehicle to travel to a next fuel station and without completely filling said fuel tank, said next fuel station having a fuel price lower than that of said current fuel station.

28. A vehicle having a fuel tank and traveling along a path having a plurality of fuel stations distributed along said path, and for use with a fuel management system including a central station having a controller system for optimizing refueling schedules of said vehicle, based on fuel consumption rates, distances, fuel amounts in said fuel tank, and fuel prices, said vehicle comprising:

a fuel sensor for continuously measuring a level of fuel in said fuel tank and providing fuel level data;

a global positioning system (GPS) for determining a location of said vehicle along said path; and a transmitter for transmitting fuel level and GPS data to said central station, wherein said controller system obtains data for the lowest price fuel available based on the tank level being measured continuously by said fuel sensor, and wherein said controller system controls fueling of said fuel tank such that refueling of said fuel tank is performed only partially at a lowest price fuel station that the vehicle can reach.

29. A vehicle according to claim 28, further comprising a controller on board said vehicle for storing a record of current geographical locations of said fuel stations and current fuel prices thereat, and for calculating refueling schedules of said vehicle at said fuel stations based on an output from each of said GPS and said fuel sensor, and a fuel price at at least some of said fuel stations.

30. The vehicle according to claim 28, wherein said fuel tank is refueled at a current fuel station only to a level which enables said vehicle to travel to a next fuel station and without completely filling said fuel tank, said next fuel station having a fuel price lower than that of said current fuel station.

31. A management system for a vehicle having a commodity storage region and traveling along a path having a plurality of geographically-distributed commodity replenishing stations, said system comprising:

a sensor for continuously measuring a level of said commodity in said storage region and providing commodity level data;

a global positioning system (GPS) for determining a location of said vehicle along said path; and a controller for storing current geographical locations of said commodity replenishing stations and current commodity prices thereat, and for calculating commodity replenishing schedules of said vehicle at said replenishing stations based on outputs from said GPS and said sensor, and a commodity price at at least some of said replenishing stations, wherein said controller obtains data for the lowest price commodity available based on the commodity level in said storage region being measured continuously by said sensor, and wherein said controller controls replenishment of said storage region such that replenishment of said storage region is performed only partially at a lowest price commodity replenishing station that the vehicle can reach.

32. The system according to claim 31, wherein said storage region is replenished at a current commodity replenishment station only to a level which enables said vehicle to travel to a next replenishment station and without completely filling said storage region, said next replenishment station having a commodity price lower than that of said current replenishment station.

* * * * *